R. B. HUGUNIN.
HORSESHOES.

No. 193,763. Patented July 31, 1877.

WITNESSES
Jno. D. Patten
W. T. Hutchinson

INVENTOR
Robert B. Hugunin

UNITED STATES PATENT OFFICE.

ROBERT B. HUGUNIN, OF NEW YORK, N. Y.

IMPROVEMENT IN HORSESHOES.

Specification forming part of Letters Patent No. 193,763, dated July 31, 1877; application filed July 25, 1877.

*To all whom it may concern:*

Be it known that I, ROBERT B. HUGUNIN, of the city, county, and State of New York, have invented certain new and useful improvements in hinged or expanding shoes for contracted hoofs in animals, of which the following is a specification:

This invention consists in the application and use, in connection with an expanding or hinged shoe, of an adjusting-bolt arranged to work loosely through beveled bearing-holes in one or both ends of the shoe, one end of the bolt having a turned or round bearing and shoulder, the other having a screw-thread cut upon it, and working through a nut, the shoulder of the round bearing end working against the lug on one end of the shoe, and the screw end working through the other end of the shoe or lug, with the adjusting-nut resting against the lug, the nut being held from turning by the locking-projection on the front end of the lug, the expansion of the hoof in this case being obtained by turning the bolt; or this locking-projection may be arranged to lock the adjusting-bolt, and allow the turning of the nut to expand the shoe after the same is secured to the hoof. The object of the beveled bearings for the adjusting-bolt is to allow the shoe to open without binding or bending the bolt, and of the nut or bolt locking projection to enable the expansion to take place by turning either the nut or bolt, without holding the other.

My invention also consists in combining with the adjusting-bolt, working in beveled bearing or bearings, and the nut or bolt locking projection, the flanges extending upward from the inner sides of the shoe back of that part of it nailed to the hoof, the object being to hold the rear inner sides of the hoof and expand them with the shoe and that part of the hoof nailed to it.

Figure 1:
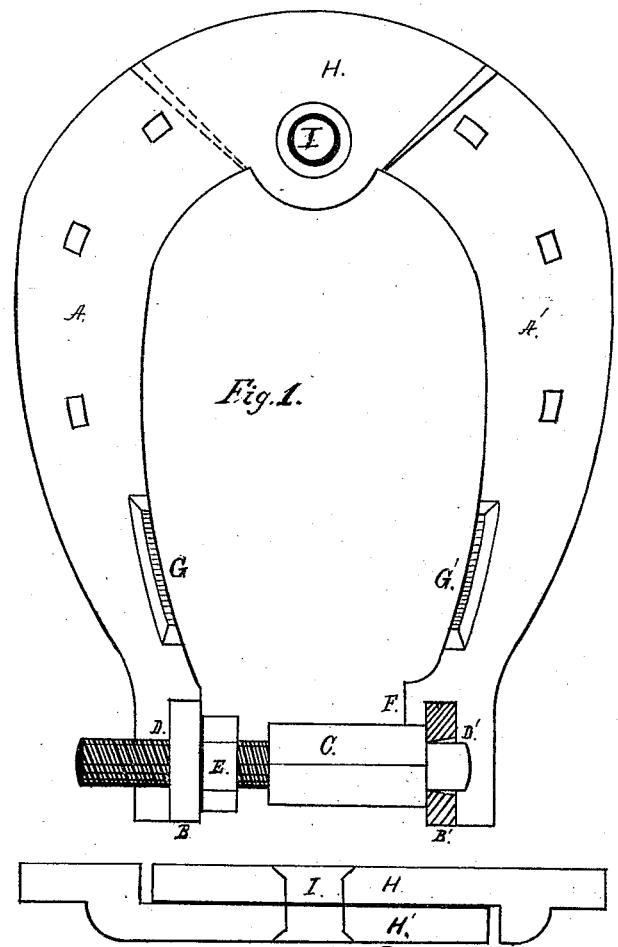
Figure 1 is a plan of my improvements in expanding shoes, showing adjusting-bolt, section of beveled bearings, lock-projection, and flanges.
Figure 2:
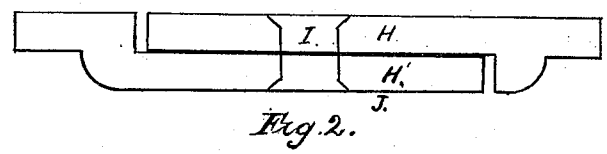
Fig. 2 is an elevation of the front end of the shoe, showing the general construction of the lips of the hinge and uniform thickness of metal in each part of the shoe forming the hinge, and the downward projection of metal on the lower lip of the hinge forming the toe-calk.
Figures 3, 4:
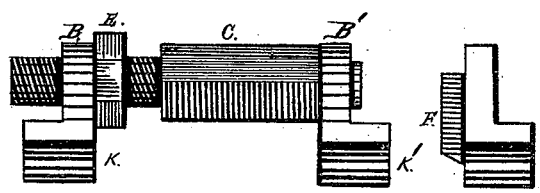
Fig. 3 is an elevation of one end of the shoe, showing the locking-projection.
Fig. 4 is an elevation of the rear ends of the shoe, with adjusting-bolt, nut, and lugs.

A A' represent the two sides of my hinged shoe; B B', lugs with bearings for the adjusting-bolt on the rear ends of the shoe.

C represents the adjusting-bolt, made preferably square, for use in grasping in turning while expanding the shoe and hoof. This bolt has a round bearing on one end and a male screw cut upon the other.

D D' are beveled bearings for the ends of the adjusting-bolt in lugs B B' on the end of the shoe. These beveled bearings may be confined to one or both lugs. When used in one lug only the female screw for the bolt is cut in the other lug; but this does not give as perfect freedom from cramping the bolt while opening the shoe.

E is a screw-nut, through which the screw end of the bolt C works, forcing the nut against the lug B, the shoulder end of the bolt pressing against lug B' while expanding the shoe and hoof, the bevels of bearings D D' allowing the angle between the bolt and shoe ends to be increased without binding the bolt in its bearings.

F is a lock-projection on the lug B or B', for locking either the nut or bolt from turning while the other is being turned in expanding the shoe after it has been secured to the animal's hoof.

G G' are flanges, constructed and extending upward from the inner sides of the shoe back of that part of it nailed to the hoof, to catch and expand the rear ends of the hoof with that part nailed to the shoe.

H H' are upper and lower extending lips of the hinged portion of the shoe. It will be observed from the drawings that a uniform thickness of metal, composed with the rest of the shoe, is retained in the hinged lips. The lower lip extends well around and downward, and forms a solid base for an efficient toe-calk.

I is the hinge-bolt for hinging the sides A and A' together.

J is the toe-calk.

K K' are heel-calks.

In operation the adjusting or expanding of this shoe takes place after it has been fitted and nailed to the animal's hoof, the screw being tightened from day to day until the contracted hoof is expanded to its proper position. By soaking the hoof it can be the sooner expanded without risk of cracking the same.

A shoe made thin in front and without a hinge could be used with my invention, though not as desirable in its action on the hoof. This would be an expanding shoe.

I disclaim the invention of the adjusting screw-bolt secured at one end from turning in the heel-calk of the shoe by means of a slot and rivet through the same, the other end of the bolt encompassed by a sleeve-nut, with a female screw-thread working over a male thread cut upon the bolt, the base of the sleeve-nut having a tapering bearing end made upon it, fitting in a hole bearing in the other heel-calk of the shoe.

I claim as my invention—

1. In combination with an expanding or hinged shoe, the bolt C, nut E, and nut or bolt locking projection F, substantially as and for the purposes specified.

2. In combination with an expanding or hinged shoe, the lugs B B', having beveled bearings D or D', or both, with bolt C, substantially as and for the purposes specified.

3. The arrangement and combination of plates A A', bolt C, nut E, lugs B B', with flanges G G', substantially as and for the purposes specified.

ROBERT B. HUGUNIN.

Witnesses:
  JNO. D. PATTEN,
  W. T. HUTCHINSON.